(12) United States Patent
Rabanne et al.

(10) Patent No.: US 6,989,748 B2
(45) Date of Patent: Jan. 24, 2006

(54) BATTERY WITH INTEGRATED TRACKING DEVICE

(75) Inventors: Michael C. Rabanne, West Valley City, UT (US); Steven D. Ivie, West Valley City, UT (US)

(73) Assignee: MRSI International, Inc., Stansbury Park, UT (US)

( * ) Notice: Subject to any disclaimer, the term of this patent is extended or adjusted under 35 U.S.C. 154(b) by 0 days.

(21) Appl. No.: 10/174,527

(22) Filed: Jun. 17, 2002

(65) Prior Publication Data

US 2003/0011478 A1 Jan. 16, 2003

Related U.S. Application Data

(63) Continuation-in-part of application No. 09/954,622, filed on Sep. 17, 2001, now Pat. No. 6,570,504, which is a continuation-in-part of application No. 09/495,535, filed on Jan. 31, 2000, now Pat. No. 6,304,186, which is a continuation of application No. 09/132,916, filed on Aug. 12, 1998, now Pat. No. 6,084,517.

(51) Int. Cl.
*G08B 13/14* (2006.01)

(52) U.S. Cl. .............................. 340/572.1; 340/539.32; 340/693.12

(58) Field of Classification Search ............. 340/573.1, 340/572.1, 539.13, 539.15, 539.32, 693.5, 340/693.12, 573.4
See application file for complete search history.

(56) References Cited

U.S. PATENT DOCUMENTS

| 4,399,431 A | 8/1983 | Satomi et al. |
| 5,028,909 A | 7/1991 | Miller |
| 5,086,290 A | 2/1992 | Murray et al. |
| 5,204,657 A | 4/1993 | Prosser et al. |
| 5,265,264 A * | 11/1993 | Dzung et al. ............... 455/90.1 |
| 5,289,163 A | 2/1994 | Perez et al. |
| 5,307,053 A * | 4/1994 | Wills et al. ............... 340/573.1 |
| 5,340,662 A * | 8/1994 | McCarter ........................ 429/9 |
| 5,446,783 A | 8/1995 | May |

(Continued)

FOREIGN PATENT DOCUMENTS

EP 0581416 B1 8/1997

(Continued)

OTHER PUBLICATIONS

Semco Fast Track Pager For Quick & Friendly Service Brochure.

(Continued)

*Primary Examiner*—Thomas Mullen
(74) *Attorney, Agent, or Firm*—Morriss O'Bryant Compagni

(57) ABSTRACT

A system for selectively detecting the presence of one or more objects in proximity to a person. The system includes one or more child units each having a first communicating device (such as a transceiver) for sending a locator signal and for receiving a control signal. Further, the system includes a parent unit having a second communicating device for receiving the locator signal from at least one of the child units, a processor for monitoring the at least one child unit and for determining whether the child unit is within a preselected range, at least one alarm for signaling the person when the selected child unit is outside the preselected range, and controls for selectively controlling the child units to be monitored and for controlling activation of the child units. The child units are comprised of a battery incorporated with child unit circuitry in a conventional battery configuration. The battery/child unit assembly is configured to allow the child unit to be incorporated into any existing electronic device without requiring modification to the existing electronic device.

24 Claims, 17 Drawing Sheets

U.S. PATENT DOCUMENTS

| | | | |
|---|---|---|---|
| 5,515,419 A | 5/1996 | Sheffer | |
| 5,552,773 A | 9/1996 | Kuhnert | |
| 5,565,848 A | 10/1996 | Leyden et al. | |
| 5,608,378 A | 3/1997 | McLean et al. | |
| 5,621,388 A | 4/1997 | Sherburne et al. | |
| 5,629,677 A | 5/1997 | Staino, Jr. | |
| 5,642,095 A | 6/1997 | Cook | |
| 5,646,593 A | 7/1997 | Hughes et al. | |
| 5,652,570 A | 7/1997 | Lepkofker | |
| 5,661,460 A * | 8/1997 | Sallen et al. | 340/573.1 |
| 5,677,673 A | 10/1997 | Kipnis | |
| 5,677,675 A | 10/1997 | Taylor et al. | |
| 5,680,105 A | 10/1997 | Hedrick | |
| 5,686,891 A | 11/1997 | Sacca et al. | |
| 5,689,238 A | 11/1997 | Cannon, Jr. et al. | |
| 5,689,240 A * | 11/1997 | Traxler | 340/573.1 |
| 5,698,966 A * | 12/1997 | Chen | 320/154 |
| RE35,765 E * | 4/1998 | Tuttle | 340/10.1 |
| 5,748,087 A * | 5/1998 | Ingargiola et al. | 340/573.1 |
| 5,771,002 A | 6/1998 | Creek et al. | |
| 5,786,106 A * | 7/1998 | Armani | 429/98 |
| 5,900,817 A * | 5/1999 | Olmassakian | 340/573.1 |
| 5,939,988 A * | 8/1999 | Neyhart | 340/573.4 |
| 6,067,017 A * | 5/2000 | Stewart et al. | 340/573.1 |
| 6,084,523 A * | 7/2000 | Gelnovatch et al. | 340/636.1 |
| 6,313,733 B1 * | 11/2001 | Kyte | 340/573.1 X |
| 6,537,081 B2 * | 3/2003 | Lai et al. | 439/66 |

FOREIGN PATENT DOCUMENTS

WO　　　WO 93/13604　　　7/1993

OTHER PUBLICATIONS

Semco Multi-Purpose Reminder (Personal Protection Pager—Reliable Partner) Brochure.

* cited by examiner

BATTERY WITH INTEGRATED TRACKING DEVICE

CROSS-REFERENCED TO RELATED APPLICATIONS

This continuation in part application claims priority to U.S. patent application Ser. No. 09/954,622 filed on Sep. 17, 2001, now U.S. Pat. No. 6,570,504, which is a continuation of U.S. patent application Ser. No. 09/495,535, filed on Jan. 31, 2000, now U.S. Pat. No. 6,304,186, which is a continuation of U.S. patent application Ser. No. 09/132,916, filed Aug. 12, 1998, now U.S. Pat. No. 6,084,517.

BACKGROUND

1. Field of the Invention

This invention relates generally to a system for tracking and monitoring the presence of an object, and more particularly to a system in which any battery operated device can be tracked and/or monitored relative to a parent monitoring device.

2. The Background Art

There are many electronic products on the market today that utilize batteries of various types to provide a power source for operation of the device. While battery operated, many of these devices are quite valuable and thus expensive to replace if lost or stolen. One such device is particularly susceptible to loss due to its size and frequent use. This device is a cell phone. As cell phone technology has advanced, the size of cell phones has significantly decreased. In addition, cell phones have become common personal item that are carried with many people at all times. Because of their small size and the frequency of their use, thousands of cell phones have been lost. That is, a user often sets their cell phone down and then leaves that location without taking their cell phone with them. It is often the case, however, that the cell phone is not located after its loss.

Loss of battery operated electronic devices is also common with such things as computer laptops, PDAs, digital music players, cameras, camcorders and other expensive electronic devices. Various devices are known in the art for monitoring or locating objects that are commonly found in possession of a person. For example, in U.S. Pat. No. 5,680,105 a lost object locator includes activation units that are mounted on a rack and response units that are attached to objects that are commonly misplaced such as car keys. Each of the activation units corresponds to a single response unit and when one of the objects that has a response unit attached thereto is lost or misplaced, the corresponding activation unit can be activated to send a signal to the response unit on the lost object. When the response unit attached to the lost object receives the signal from the activation unit, an audible tone is emitted from the response unit which, ideally, will indicate the location of the lost object to the person activating the activation unit. The invention also provides for mobile activation units that can be placed in areas that the person believes are nearer the lost object so that the audible tone can be easily detected by the person when the response unit is activated by the activating unit. Such a system, however, requires custom made components that are attached to the object to be tracked.

Likewise, the device for monitoring or locating objects disclosed in U.S. Pat. No. 5,646,593 is comprised of a child proximity detector which includes a parent unit that receives pulse signals on a regular interval from a child unit. When the parent unit fails to receive a signal from the child unit, an alarm condition is established in the parent unit. Again, such systems are not designed to be incorporated into existing electronic products.

In another example, U.S. Pat. No. 5,621,388 provides the function of a child proximity detector by monitoring a person, or persons, to determine if they have moved, or been moved, further than a preselected distance from a base station. Once again, the system does not provide the capability of being incorporated into existing electronic devices without significant modification.

Thus, it would be highly advantageous to provide a device for tracking any battery operated device simply by substituting the existing conventional battery with one that provides the device with the capability of being tracked.

SUMMARY OF THE INVENTION

Accordingly, a system for selectively detecting the presence of one or more objects in proximity to a base or parent unit is comprised of one or more child units and at least one parent unit for monitoring the one or more child units. Each child unit is generally in the form of a battery with each battery including a communicating device for transmitting and/or receiving a signal from a parent unit to allow the parent unit to locate or at least determine a range between the parent unit and the child unit. The communicating device of the child unit may be in the form of a transceiver for sending and/or receiving a locator signal.

The parent unit is also provided with a communicating device for receiving the locator signal from the one or more child units and a processor for interpreting the locator signal to determine whether the child unit is within a preselected range or at a desired location. The parent unit also includes at least one alarm for signaling when a child unit is outside the preselected range or is not at the desired location. Controls are provided to control the functions of the parent unit as well as selectively controlling each child unit.

In general, the parent unit is configured to communicate with at least one child unit. The child unit, which is incorporated into a battery, is inserted into the battery compartment of a mobile telephone, a portable computer or other electronic device. The parent and child units can be used by the person to manage the objects by allowing the person to program the parent unit according to the person's desired management parameters. For example, the person could utilize a child battery unit in their mobile telephone and program the parent device to indicate to the person when the mobile telephone exceeds a particular distance from the person. If the person has intentionally left the mobile telephone behind that exceeds the particular distance that was programmed into the parent device, the person can force the parent unit to ignore signals, or lack thereof, from the child unit or de-activate the communication device of the child unit so that the child unit no longer emits a ranging signal.

Advantageously, the parent device can de-activate a single child device without affecting any other child devices. It should be noted that the parent and child units include circuitry that may include processors, microprocessors, or analog or solid state electrical circuitry for programming numerous functions according to the desires of the person managing the objects. Of particular note, a child unit can be used to locate the parent device if the parent device is misplaced or lost. Furthermore, the parent unit can automatically detect certain external communication signals, such as an airline transponder, that require communication signals between the parent and child units to cease. Upon detecting such external communication signals, the parent unit can be programmed to automatically shut down itself and the child units.

The battery with integrated tracking device of the present invention may be in the form of various standard types of batteries such as those commonly identified as AA, AAA, C, D, 9 volt, 12 Volt or the like, or in the form of more specialized types of batteries, such as those configured specifically for cell phones, laptop computers, automobiles, motorcycles or other electronic or mechanical devices that utilize a battery.

The battery with integrated tracking device is comprised of a battery and circuitry which includes at least one communication device coupled to the battery for providing a locator signal. While the power from the battery is primarily provided for the electronic device in which the battery is to be inserted, the circuitry may also be coupled to the battery such that its power consumption requirements are also drawn from the battery.

In one embodiment, the tracking device includes a transceiver for both sending signals to and receiving signals from a parent unit. The signals allow the tracking device and parent unit to communicate and allow the parent unit to locate the tracking device and/or determine a distance between the parent unit and the tracking device. Also, by utilizing a transceiver, the parent unit can remotely control the functionality of the child unit and other desired parameters.

In another embodiment, the tracking device includes a global positioning device to allow the parent unit to determine a relatively precise location of the tracking device.

The parent unit is capable of controlling activation of each child unit and allows a user to add or eliminate child units that the user would like monitored.

As previously discussed, the parent unit is also capable of automatically detecting external signals that require the parent device to cease communicating with one or more child units. As such, the parent unit can be configured to automatically shut down or temporarily suspend operation or communication when such external signals are detected. When the parent unit detects that such external signals are no longer being transmitted, the parent unit can automatically reestablishes communications with the child units. Likewise, the parent unit can be programmed to cease communication for a predetermined period of time, after which the parent unit will attempt to reestablish communication with each child unit.

The parent unit includes a tracking mechanism for assisting a user in locating one or more of the child units. The tracking mechanism may include global positioning devices or various signal receiving devices that can detect the strength of a signal transmitted by a child unit. Preferably, the tracking mechanism includes a display that can indicate the proximity to or location of one or more of the child units.

Additional features and advantages of the invention will be set forth in the description which follows, and in part will be apparent from the description, or may be learned by the practice of the present invention.

DETAILED DESCRIPTION

Figure 1:
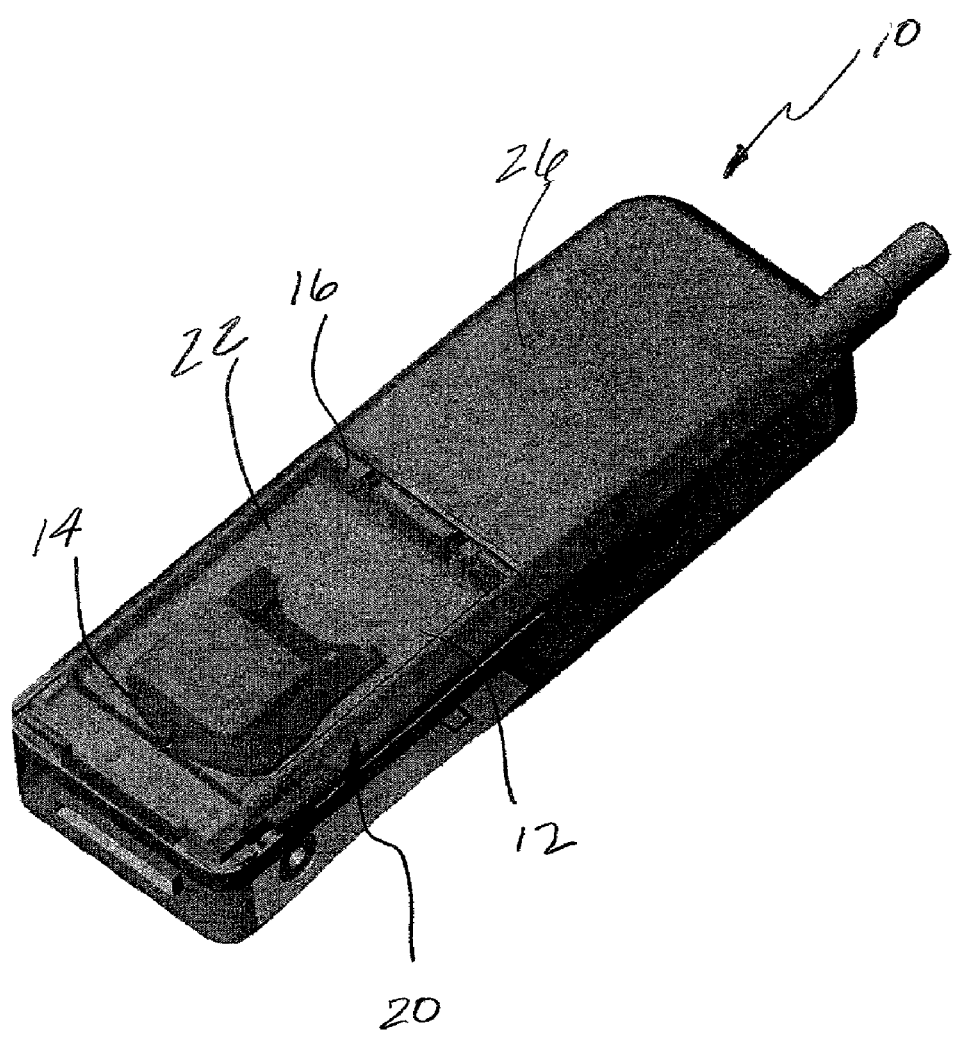
FIG. 1 illustrates a perspective back view of a first embodiment of a battery/child unit assembly incorporated into a conventional cell phone in accordance with the principles of the present invention.

FIG. 1 is an illustration of a typical cell phone, generally indicated at 10, in which a battery 12 having a tracking device 14 included therewith in accordance with the principles of the present invention is inserted into the battery compartment or recess 16 of the cell phone 10. The cell phone 10 and its associated battery compartment 16 have not been modified in order to accommodate the battery 12 of the present invention. That is, the battery 12 and its associated tracking device 14 are configured to fit into the battery compartment 16 of existing cell phones, such as cell phone 10. Of course, the present invention will include variously configured batteries to fit into various existing cell phones or other battery operated electronic devices just as there are multiple conventional batteries on the market to fit such existing cell phones or other battery operated devices.

Thus, a principle advantage of the present invention is the ability to provide a tracking feature to an existing electronic device without requiring any modification to the electronic device. In addition, any new electronic devices that utilize battery power to operate could be easily configured to receive a battery/tracking device unit in accordance with the principle invention in order to take advantage of the tracking device's features. Furthermore, the battery/tracking device unit, generally indicated at 20, is configured in such a manner that there are little or no aesthetic external differences between the conventional battery configured for the electronic device 10 and the combination battery/tracking device unit 20 of the present invention. In order to maximize battery size, however, in those electronic devices, such as the cell phone 10 shown in FIG. 1, where one side of the battery is exposed when attached to an electronic device, it may be acceptable to integrate the tracking device 14 into the battery casing 22 in such a manner that the portion of the casing 22 housing the tracking device 14 extends above the back surface 26 of the phone 10.

Figure 2:
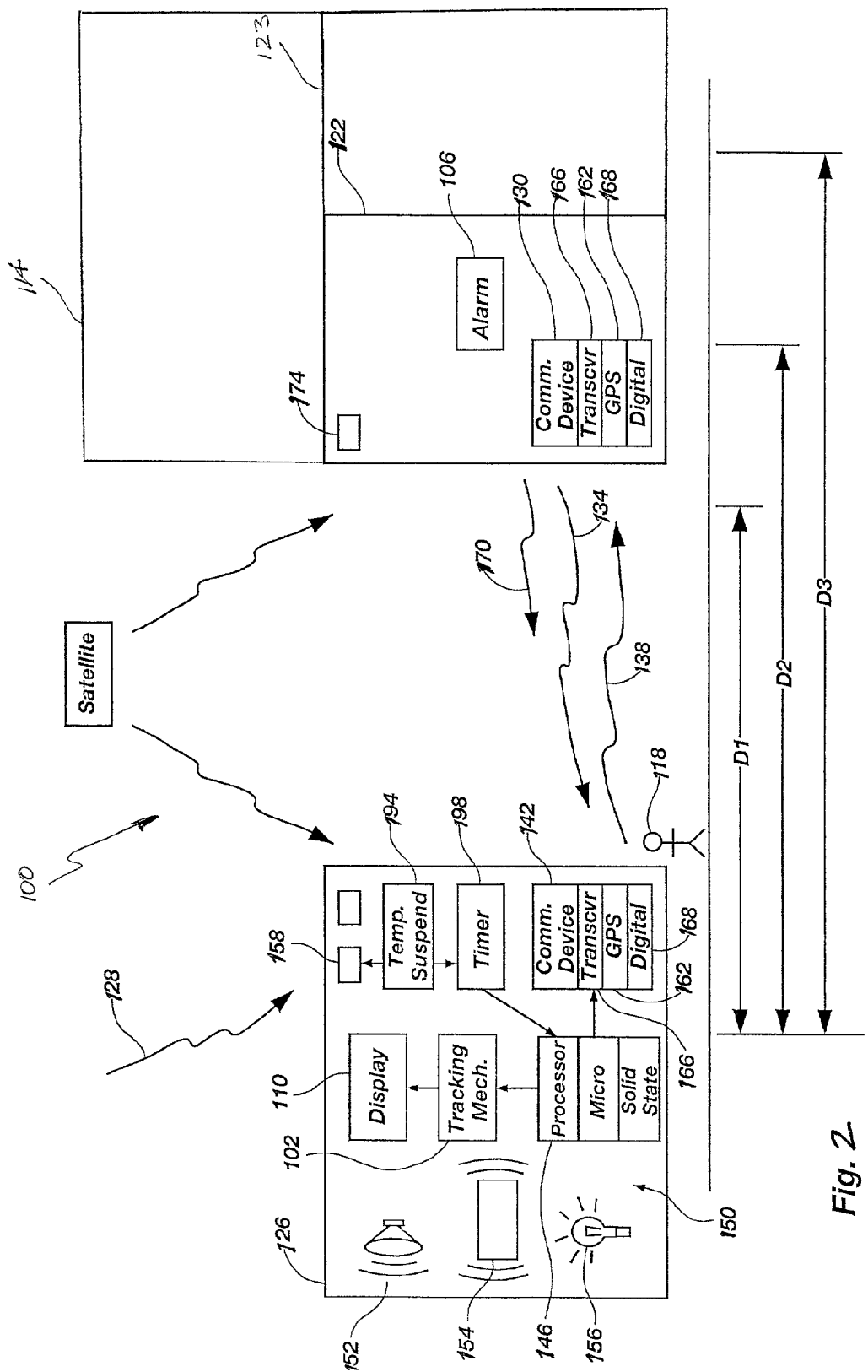
FIG. 2 is a schematic diagram of a first embodiment of a system for detecting the presence of a plurality of objects in accordance with the present invention.

As illustrated in FIG. 2, a system, indicated generally at 100, for selectively detecting the presence of one or more objects 114 in proximity to a person 118 or parent unit 126 in accordance with the present invention is shown. The plurality of objects 114 may include various battery operated devices. The system 110 includes one or more child units 122 and a parent unit 126. The child units 122 are incorporated into a battery 123 which is attached or otherwise located within each of the plurality of objects 114. The parent unit 126 is configured for being carried by or otherwise located with the person 118.

The child unit 122 has a first communicating device 130 for sending a locator signal 134 and for receiving a control signal 138. The parent unit 126 has a second communication device 142 for receiving the locator signal 134 from at least one child unit 122, or a selected child unit, and for sending the control signal 138. The first and second communicating devices 130 and 142 may be transceivers or global positioning devices as discussed more fully below.

The parent unit 126 has electronic means such as processor 146 for receiving data in the form of a signal from the communication device 142 and interpreting the data in order to provide a monitoring function that allows the parent unit 126 to determine the relative range or position of the at least one child unit 122, or the strength of the signal 134 from the first communicating devices 130. As such, the processor 146 is capable of determining whether the child unit 122 is within a preselected range, indicated by D1, D2, and D3, based on the signal 134 from the first communicating device 130. The processor 146 may be a microprocessor, analog or solid state electrical circuitry and/or other devices known in the art.

The parent unit 126 has at least one alarm or indicator 150 for signaling a person 118 when the at least one child unit 122, or the selected unit, is outside the preselected range D1, D2, or D3. The alarm 150 emits or produces a humanly perceptible alarm when a particular or selected child unit 122 is outside the range D1, D2, or D3. The alarm emitted may be audible or silent, but is configured to be humanly perceptible.

The alarm or indicator 150 may include a speaker 152, a vibrator 154, and/or a light 156 for indicated when the selected child unit 122 is outside the preselected range D1, D2 or D3. The speaker 152 emits an audible signal. The vibrator 154 silently indicates by vibrating the device. The light 156, of course, emits a visible light. Thus, the alarm emitted by the alarm 150 may be silent, audible, and/or visible.

The alarm 150 may include all or various combinations of the above alarms for indicating in different ways when the selected child unit 122 is outside a first, second, and third preselected ranges D1, D2 and D3. For example, the at least one alarm 122 may include a vibrator 154 for indicating when the selected child unit 122 is outside a first preselected range D1; a light 156 for indicating when the selected child unit 122 is outside a second preselected range D2; and a speaker 152 for indicating when the selected child unit 122 is outside a third preselected range D3. Thus, the alarm 150 can progressively emits a series of vibration, light, and sound as the child unit 122 moves progressively through the first, second and third ranges D1, D2, and D3.

The parent unit 126 has controls 158 for selectively controlling the at least one child unit 122, or plurality of child units, to be monitored and for controlling activation of the child units 122. The parent unit 126 may selectively activate or de-activate any of the plurality of child units 122. Thus, the controls 158 allow the parent unit to control which child units 122 are activated. In addition, the parent unit 126 may also selectively monitor the child units 122. Thus, the controls 158 allow the parent unit to monitor only selected child units 122.

As indicated above, the communicating devices 130 and 142 may be transceivers 166. The transceivers 166 may transmit continuously or in pulses. Alternatively, the communicating devices 130 and 142 may be digital devices 168 for sending digital signals. Furthermore, global positioning devices 162 may be employed to calculate global positions of the child unit 122 and the parent unit 126. In such a device, a global positioning device 162 is associated with each of the parent units 126 and child units 122. The processor 146 may use the global positions for determining a relative position of the child unit 122 with respect to the parent unit 126 resulting in a range D1, D2 or D3.

In addition, the child units 122, or the first communicating device 130, advantageously may send a signal 170 for locating the parent unit 126. Thus, not only can the parent unit 126 send a signal to locate the child unit 122, but the child unit 122 can send a signal 170 to locate the parent unit 126. The child unit 122 may have a control 174 for activating the first communicating device 130 to send the signal 170. The signal 170 sent by the child unit 122 may cause the parent unit 126, or alarm 150 of the parent unit, to emit an alarm, either silently, audibly, and/or visibly.

The processor 146 may be programmable to control various features and functions of the units 122 and 126. For example, the processor 146 advantageously may be programmed to de-activate the first and second communicating devices 130 and 142 when the second communication device 142 detects certain external communication signals 128. Selective de-activation may include deactivating the locator signal 134 of the first communicating device 130. In such a situation, the controls 158 of the parent unit 126 are set to de-activate the locator signal 134 of the first communicating device 130. Such a situation may occur in airline travel where certain signals, which may include the signals 134 and 138 produced by the first and second communicating devices 130 and 142 of the units 122 and 126, are restricted. Such an external communication signal 128 may be a transponder signal associated with airline travel. The processor 146 causes the second communicating device 142 of the parent unit 126 to send a control signal 138 to the child unit 122 causing the child unit 122 to de-activate. In addition, the processor 146 causes the parent unit 126 to de-activate. The units 122 and 126 may remain de-activated until manually activated by the person, or may automatically re-activate after a certain time period. De-activation of the child units 122 also may be controlled manually as previously described.

The parent unit 126 may have a mechanism 194 for temporarily terminating signals 134 and/or 138 between the first and second communicating devices 130 and 142. The parent unit 126 may also have an adjustable timer 198 for selecting a period of temporary termination of the signals 134 and/or 138. The signals 134 and 138 may be terminated by the mechanism 194 in response to the external communication signals 128 as discussed above. In addition, the signals 134 and 138 may be terminated by the mechanism 194 in response to the controls 158 when desired by the person.

The parent unit 126 may also have a tracking mechanism 102 for locating the at least one child unit 122. The child unit 122 may include an alarm or indicator 106, similar to the alarm 150 of the parent unit 126, for producing or emitting an alarm when signaled by the tracking mechanism 102 of the parent unit 126. The tracking mechanism 102 may include a display 110 for indicating the proximity of the at least one child unit 122 to the parent unit 126. The tracking mechanism 102 may cause the second communicating device 142 of the parent unit 126 to send a signal 138 to the child unit 122, which in turn causes the alarm 106 of the child unit 122 to emit an alarm.

Figure 3:
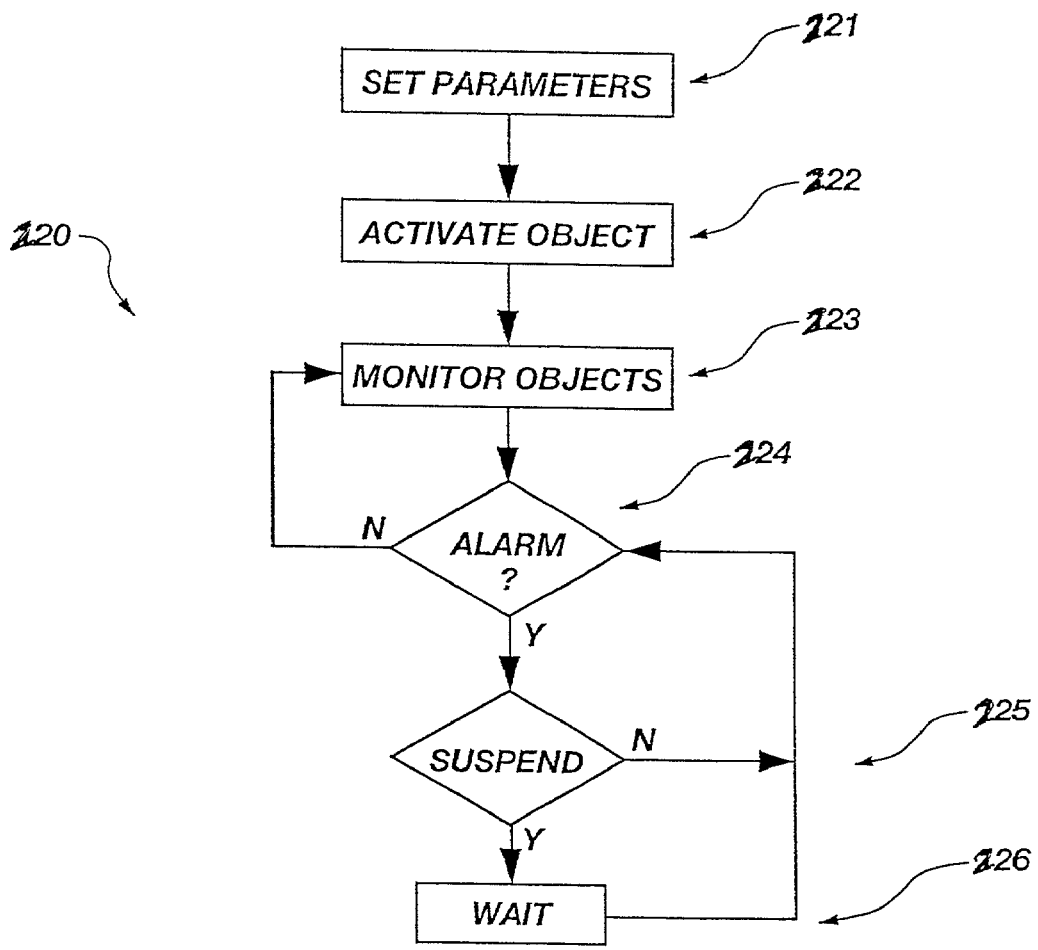
FIG. 3 is a functional block diagram of a first embodiment of a parent unit in accordance with the present invention.

FIG. 3 illustrates a functional block diagram of an embodiment of the parent unit of the present invention wherein schematic blocks illustrate the functions of the parent unit and the following functions are shown: setting parameters of the parent device 221, selectively activating objects 222, and monitoring objects 223. Also shown is a block representing the function for detecting whether an alarm state exists 224 in the parent device. If no alarm state exists, then the parent device continues to monitor objects but if an alarm state exists, the parent device has the function of choosing whether to suspend the alarm state 225 and enter a temporary waiting state 226, or not to suspend the alarm state but to again detect whether an alarm state exists in the parent device. Of course, the functional block diagram of FIG. 3 is a simple embodiment of the present invention and additional functions such as automatically de-activating the parent device upon detection of certain external communication signals can be added. Further, a function for detecting a signal from the child device could be added when the child device is used to locate the parent device. Still further, the parent device can have the function of choosing to selectively de-activate a single child device. Those skilled in art and viewing the invention will understand that additional functions can be implemented in the parent device.

Figure 4:
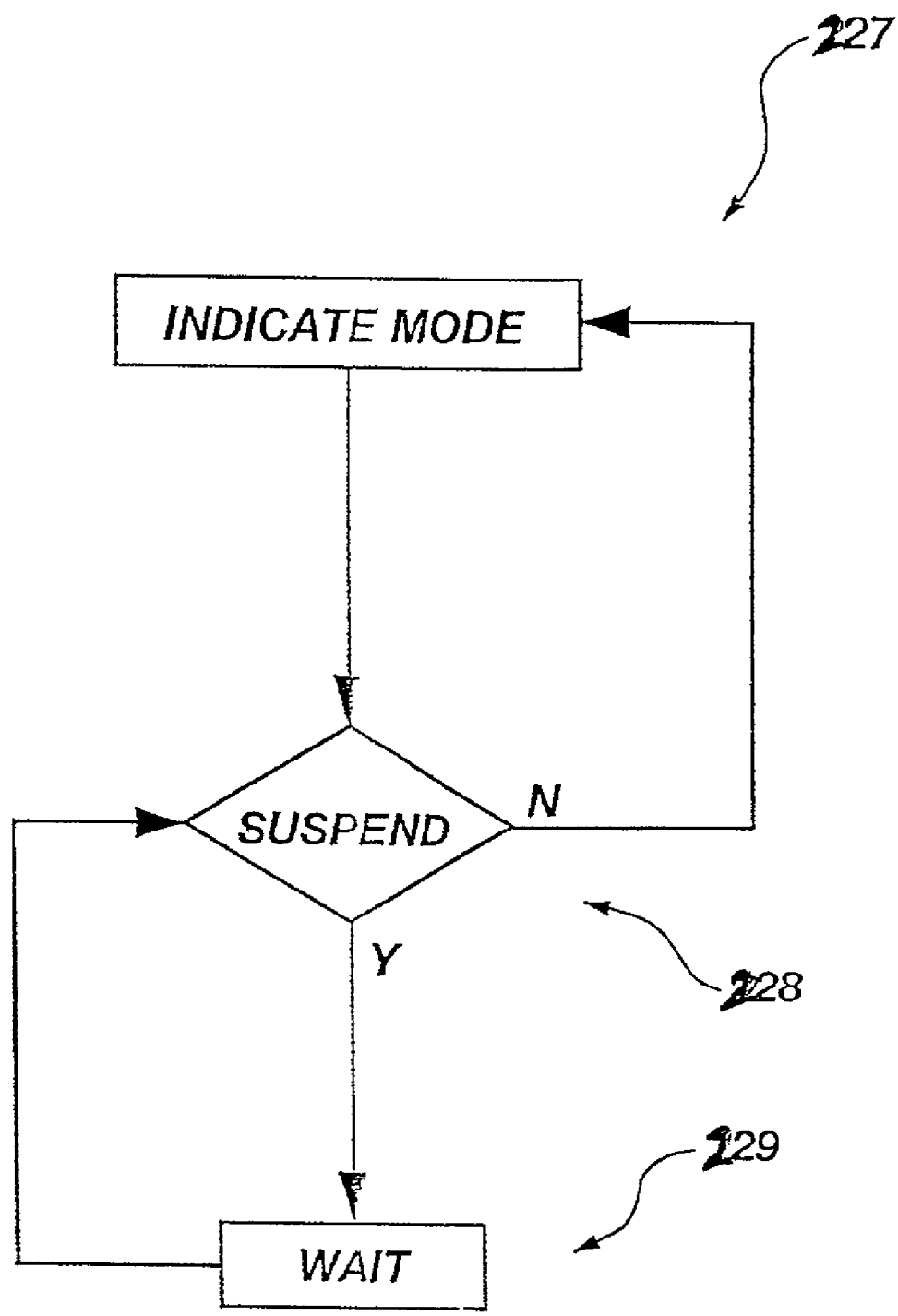
FIG. 4 is a functional block diagram of a first embodiment of a child unit in accordance with the present invention.

FIG. 4 illustrates a functional block diagram of an embodiment of a child device. Similar to FIG. 3, the block diagram is an embodiment which shows basic functions of the child device. The function of an indicator mode 227 for indicating a current status to the parent unit is shown leading to the suspend function 228. This arrangement allows the child device to remain in the indicator mode 227 until the child device is suspended. Once it is suspended, the child device enters a wait state 229 where the device is de-activated for a predetermined amount of time before it returns to the indicator mode 227.

Figure 5:
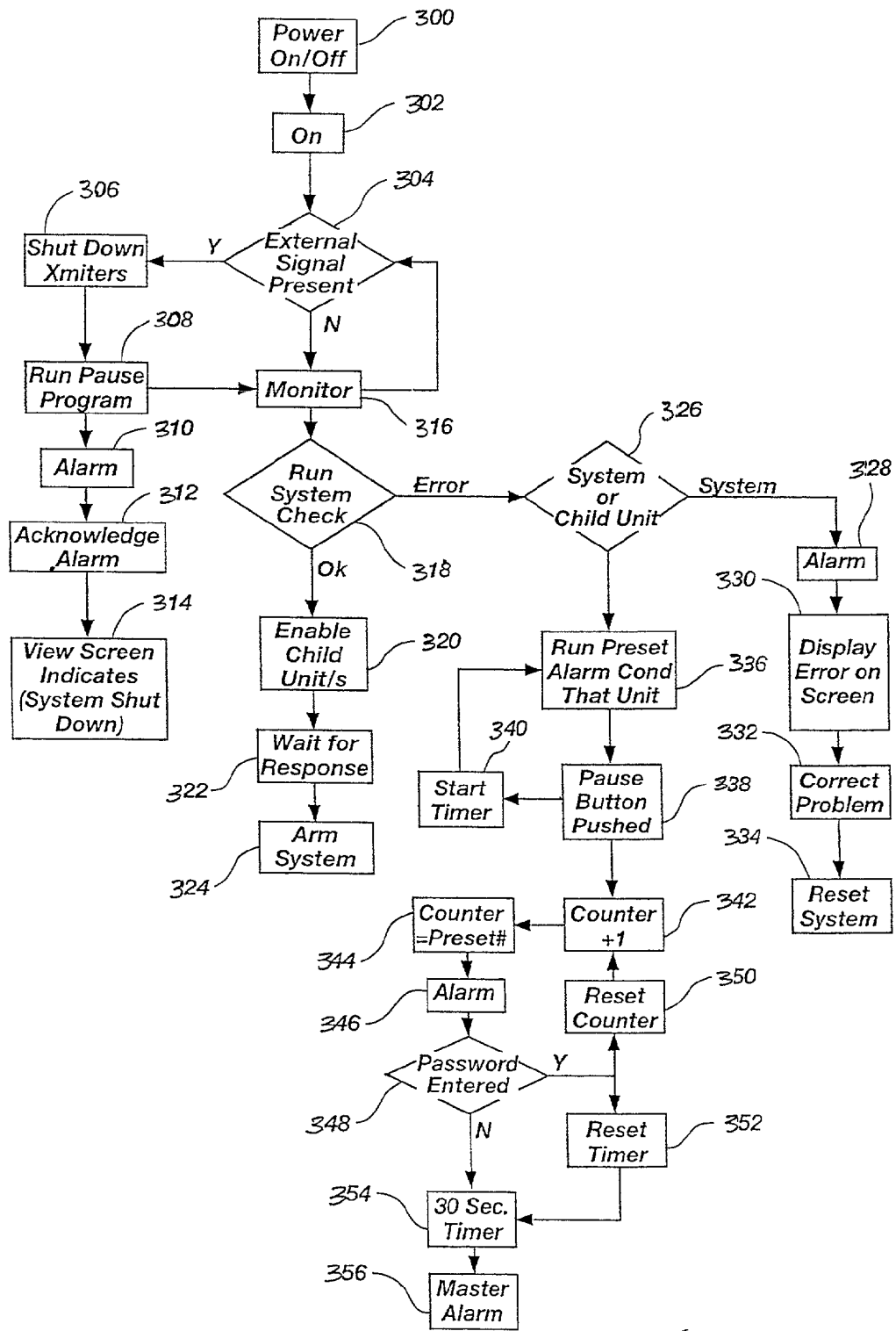
FIG. 5 is a functional block diagram of a second embodiment of a parent unit in accordance with the principles of the device of the present invention when the parent unit is activated.
Figure 6:
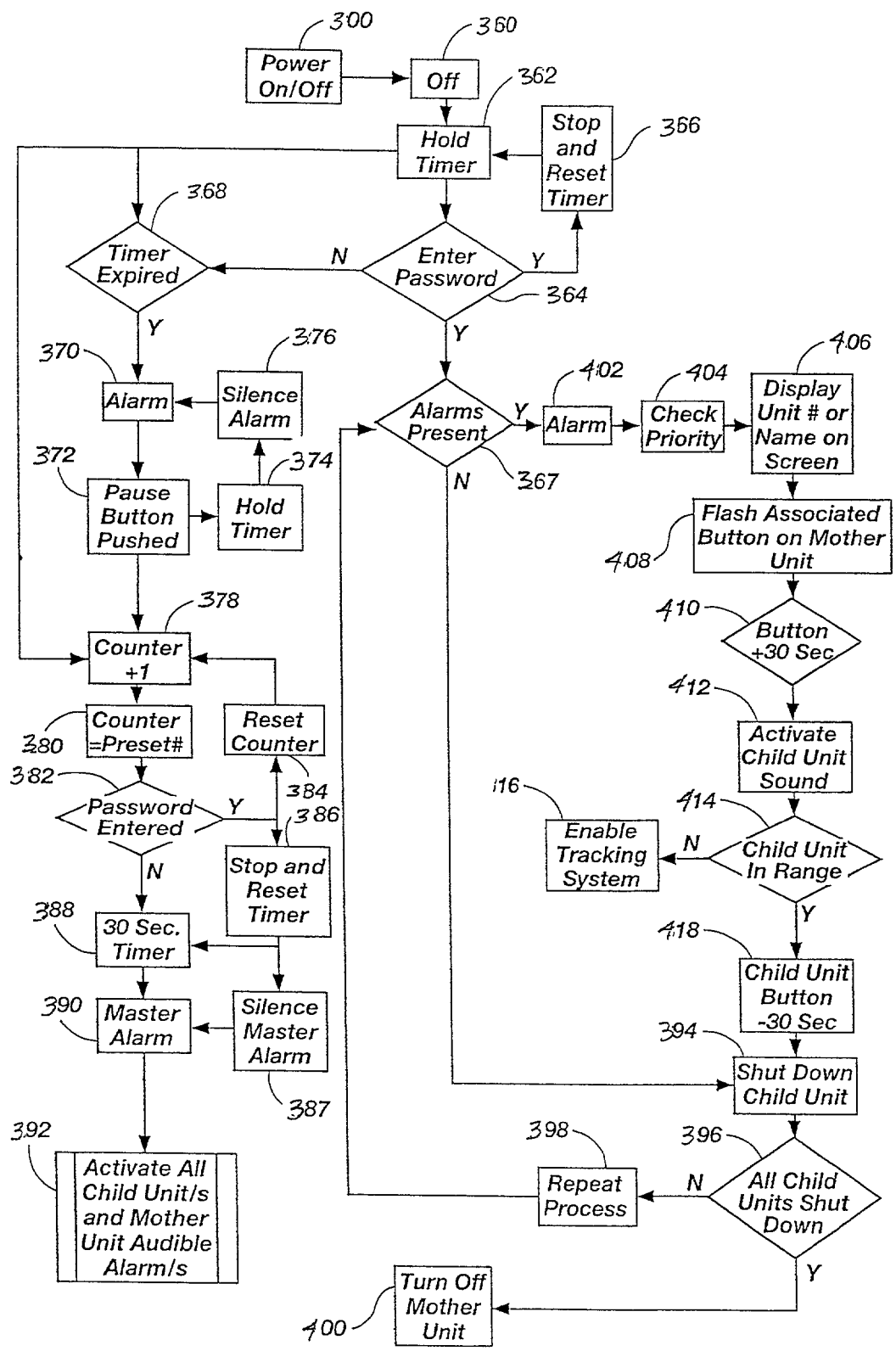
FIG. 6 is a functional block diagram of a third embodiment of a parent unit in accordance with the principles of the present invention when the parent unit is deactivated.

FIGS. 5 and 6 illustrate functional block diagrams of an embodiment of the parent unit of the present invention wherein schematic blocks illustrate the functions of the parent unit. FIG. 5 illustrates the function of the parent unit when the unit turned on, while FIG. 6 illustrates the function of the parent unit when the unit is turned off.

Referring now to FIG. 5, the parent unit has a power switch or on/off control 300. When the unit is turned on 302, the parent unit checks to see if an external signal is present 304, as discussed above. If the parent unit detects an external signal, it shuts down 306, or de-activates, the transmitters, or communicating devices The parent unit may then run a pause program 308. After the pause program 308, the parent device may emit an alarm 310 which may be acknowledged 312 by the person. The parent unit indicates 314 the status of the unit, such as by a view screen or display indicating the unit or system has shut down or has been de-activated After the pause program 308, the parent device may begin monitoring 316. In addition, the parent unit continues to check for external signals 304. If no external signal is detected, then the parent unit monitors 316.

The parent unit also runs a system check 318. If no errors are detected in the system check 318, then the child units are enabled 320, or a signal is sent to the child units. The parent unit then waits for a response 322 from the child units and then arms 324.

If an error is detected, the unit determines if the error is with a child unit or the system or parent unit, indicated at 326. If the error is with the system, the parent unit emits an alarm 328 and indicates the error 330, such as on a display or screen. The error may then be corrected 332 and the system reset 334.

If the error is with the child unit, the parent device runs a preset alarm condition for that unit 336. The alarm condition 336 may be paused 338, such as by pushing a pause button. A timer is then started 340 after which the alarm condition is again run 336. In addition, a counter is advanced 342. The counter is checked 344 to see if it has reached a preset number. The parent unit then emits an alarm 346. The person may enter a password 348. If the person enters the correct password, the person may reset the counter 350 and reset the timer 352. If the password is not entered or if an incorrect password is entered, then the timer runs 354 for a period of time, for example 30 seconds, and then a master alarm sounds 356.

Referring now to FIG. 6, the parent unit has a power switch or on/off control 300. When the unit is turned off 360, the parent unit has a hold timer 362 that holds for a period of time. The person may enter a password 364. If the correct password is entered, then the timer may be stopped and reset 366. In addition, if the correct password is entered, the parent device checks to see if alarms from the child units are present 367, as discussed more fully below.

If the incorrect password is entered or if the password is not entered timely, the timer expires 368 and the parent unit emits an alarm 370. The alarm may be paused 372, such as by pushing a pause button. If the alarm is paused, a hold timer holds for a period of time 374 and the alarm is silenced 376. After the time elapses, the unit again emits an alarm 370.

In addition, when the alarm is paused 372, or when the time elapses from the hold timer 362 when the system is turned off 360, a counter is advanced 378. When the counter reaches a preset value or number 380, the person may enter a password 382. If the correct password is entered, the person may reset the counter 384 and stop and reset the timer 386. If the timer is stopped and reset, then the master alarm is silenced 387.

If the password is not entered or if an incorrect password is entered, then the timer runs 388 for a period of time, for example 30 seconds, and then a master alarm sounds 390. In addition, the parent unit activates all the child units and the parent unit emits an alarm 392.

As indicated above, if the correct password is entered after the parent unit is turned off 360, the parent unit checks the child units to see if any alarms are present 367. If no alarm is present for a child unit, then the child unit is shut down 394. The parent unit then checks to see if all the child units are shut down 364, or de-activated. If all the child units are not shut down, the process repeats 398, checking for alarms 367 and shutting down child units 394. If all the child units are shut down, then the parent unit turns off 300, or shuts down.

If the parent unit detects an alarm from the child unit after the password is entered, it emits an alarm 402. The parent unit checks the priority 404 of the alarm and indicates which unit has the alarm 406, such as by displaying the unit number on a screen The parent unit may have a button associated with each child unit that flashes 408 when the child unit has an alarm. The person may push the button 410 for a period of time. If the button is pushed, the child unit emits an alarm or other sound 412.

The parent unit checks to see if the child unit is in range 414. If the child unit is not in range, the tracking system is enabled 416. If the child unit is in range, the person may push the button 418 and the child unit will be shut down 394.

Figure 7:
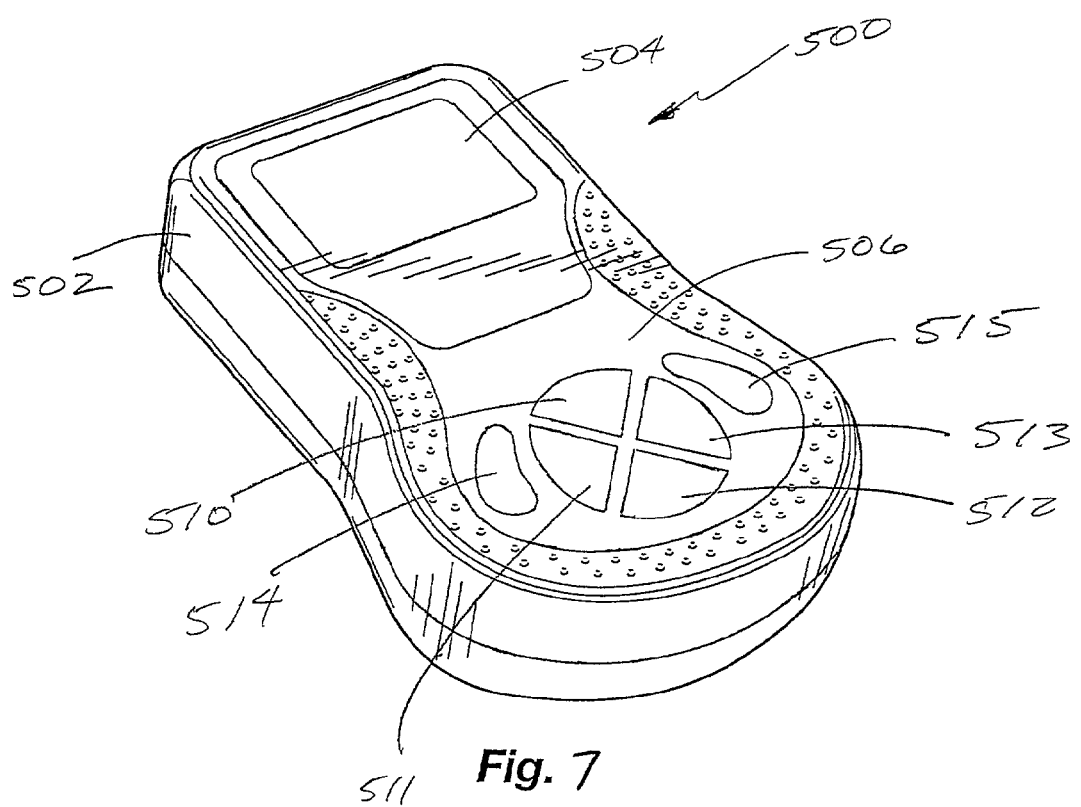
FIG. 7 is a perspective view of a fourth embodiment of a parent unit in accordance with the principles of the present invention.

FIG. 7 illustrates a parent unit, generally indicated at 500 in accordance with the principles of the present invention. The parent unit includes an outer housing 502 that contains the various components of the parent unit 500. An LCD screen 504 is mounted within the housing 502 and is provided to display various information for the operation and use of the parent unit 500. Additionally, various buttons 510, 511, 512, 513, 514 and 515 are provided on the face 506 of the housing 502 to control the function and operation of the parent unit 500.

In order to connect, that is allow the parent unit 500 to detect and thus monitor a child unit (not shown), one or more child units are placed next to the parent unit 500. Pressing any button on the parent unit 500 will display the main menu. The parent unit 500 will automatically detect each child unit and display them on the screen 504. By pressing the button 510, the menu will be selected. Pressing the button 515 will highlight the child unit to be set up using the buttons 510 or 512 to scroll through the various child units. Pressing the button 515 will allow the user to select a preset name or provide a custom name to the highlighted child unit. The user can scroll through the preset names or entering a custom name using the buttons 510 and 512. When complete, pressing the button 515 will save the selected name for the particular child unit. Pressing the button 514 once will return the user to the list of child units. Pressing the button 514 again will return the user to the main menu.

To set up alarm zones, the user will select the child unit to be configured using the buttons 510 and 512 and select the particular child unit by pressing the button 515. By highlighting and selecting the alarm settings option, the user can change the warning zone by using buttons 511 and 513. Likewise, by selecting the user can change the vibration or audible zones by using buttons 511 and 513. After any changes are made, the new settings can be saved by pressing the button 515. Pressing the button 514 returns the user to the main menu.

The parent unit 500 also includes an internal clock for which the time and date can be set and stored. By pressing the button 510 and selecting the main menu using button 515, the user can select a setup feature by pressing the button 513 two times. This will select the time/date setup function. Using the buttons 510 and 512 will allow the user to change the values of the time and date settings. Using buttons 511 and 513 allow the user to move to the previous or next time and date field. Pressing the button 515 will allow the user to save the new time and date settings and pressing the button 514 returns the device 500 to the main menu.

Of course, those of skill in the art will appreciate that various other input devices and arrangements thereof may be employed to allow the above-described functionality and control of the parent unit. For example, the buttons may have other layouts or may be replaced with a touch pad. In addition, the process of programming the device 500 may be performed by various other methods and orders of programming such a device 500. The above-described method, however, provides a simple and intuitive means of programming the parent unit 500 to operate in a manner as desired by a user.

Figure 8:
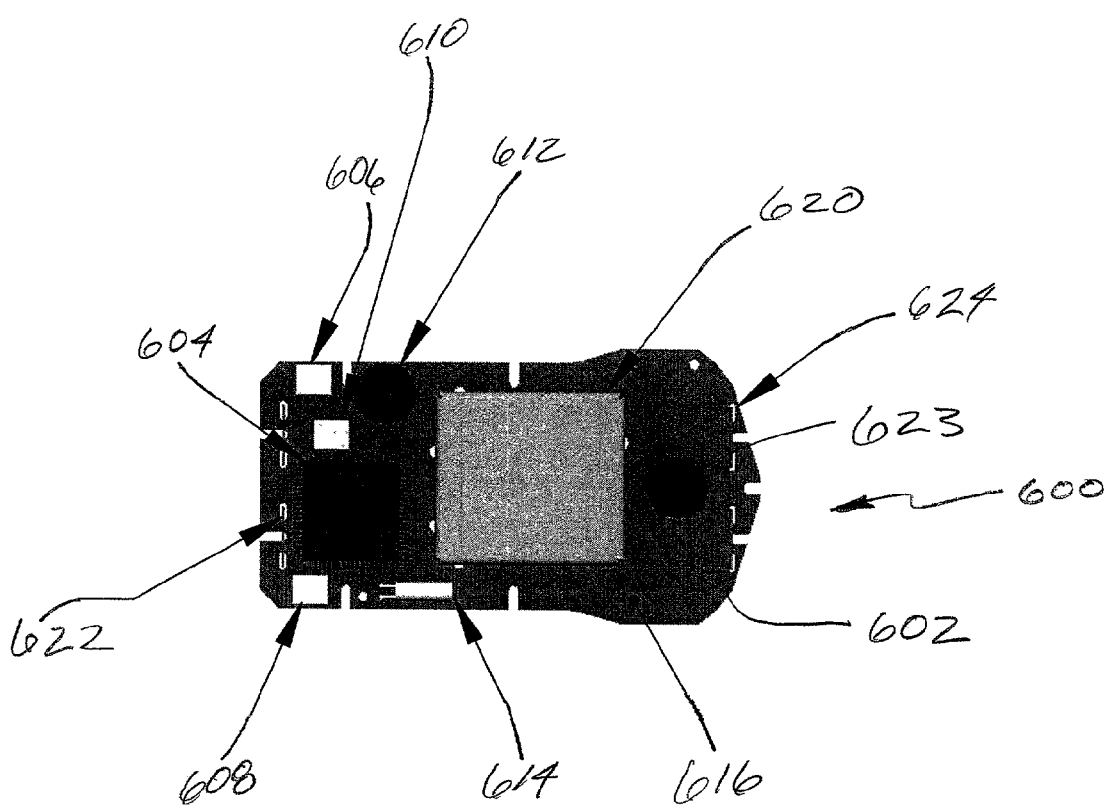
FIG. 8 is a top view of a first embodiment of a child unit circuit assembly in accordance with the principles of the present invention.

Referring now to FIG. 8, there is shown a child unit circuit assembly, generally indicated at 600, in accordance with the principles of the present invention, configured for integration with a battery (not shown). The circuit assembly 600 is comprised of a circuit board 602 to which a plurality of electronic components are attached. The printed circuit board 602 may be comprised of a rigid or flexible type circuit board or other materials known in the art. A microcontroller 604 is provided to control the operation of the circuit assembly 600. In addition, various electronic components such as filtering capacitors 606, 608 and 610 and power inductor 612 are provided to regulate the power requirements of the circuitry. A crystal 614 is also provided to receive signals from the parent unit as previously described. An antenna 616 is also provided on the circuit board.

Radio frequency circuitry is provided in an RF shield 620 to send signals to the parent unit. The RF circuitry signal is controlled by the microcontroller 604. Battery contacts 622 and 624 are coupled to the printed circuit board 602 for connecting to an associated battery or batteries. The circuit assembly 600 draws its power from the associated battery or batteries for operation. Because such a battery or batteries has a primary function of driving another electronic device, the circuit assembly 600 is configured with relatively low power requirements so as to draw little current from the associated battery or batteries and thus maintain power for the associated electronic device. Moreover, the microcontroller 604 is configured to provide various power consumption schemes so as to avoid a constant drain on the associated battery or batteries. For example, the microcontroller may be configured to draw power from the battery on an intermittent basis to communicate with the parent unit. Likewise, the microcontroller may be configured to operate in various phases, either high or low power as the situation dictates. That is, in a listening mode, power can be saved by turning off the power to the RF circuitry 624 until transmission of signal from the RF circuitry is needed. Moreover, the power from the RF circuitry 624 can be stepped down to coordinate with the ranging requirements of the parent unit. Thus, when the ranging is set at a relatively close range, the transmitting power can be reduced to conserve battery power.

The child unit circuit assembly 600 may also include a GPS (global positioning satellite) chip 623. The GPS chip 623 is connected to the microprocessor 620 to allow the child unit 600 to transmit its global position to a parent unit for location determination. Such a GPS chip 623 may be incorporated into any of the child unit devices described herein so as to provide such GPS capabilities. In such child units, the RF ranging features may be excluded. Alternatively, where GPS location is not desired, the child unit may be provided without the GPS chip 623 with ranging functions provided by RF signals.

Figure 9:
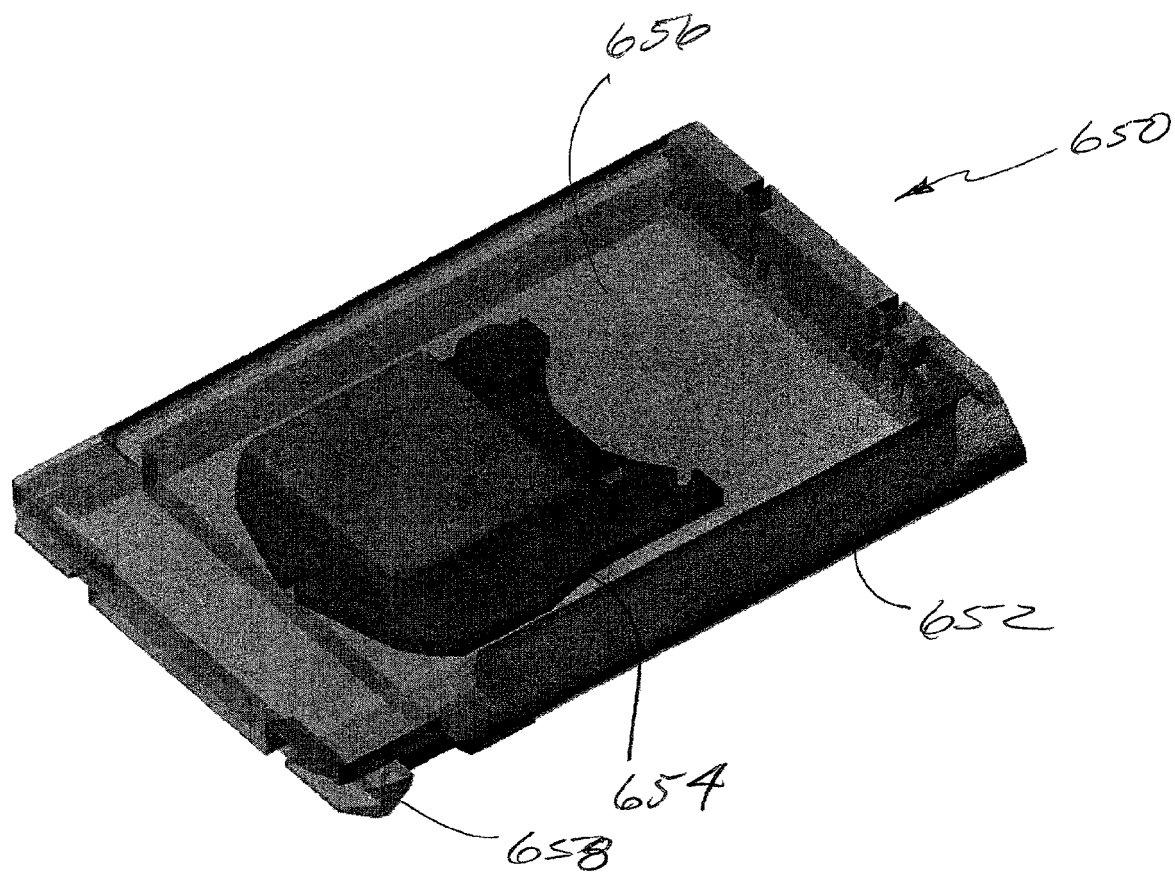
FIG. 9 is a bottom perspective view of a first embodiment of a battery/child unit assembly in accordance with the principles of the present invention.

Such a child unit circuit assembly can be incorporated into nearly any battery configuration. The child unit circuitry may be fitted within the confines of the battery housing or attached externally to the battery. For example, as shown in FIG. 9, a battery/child unit assembly, generally indicated at 650 is illustrated. The battery housing 652 is configured to be secured to a particular cell phone, such as the cell phone illustrated in FIG. 1. The child unit circuit assembly 654 is incorporated into or embedded within the housing 652 so as to be concealed therein. The circuit assembly 654 is electrically connected to the battery 656 so as to draw power therefrom for operation of the child unit circuitry. Otherwise, the housing 652 of the cell phone battery 650 is configured in every way as a conventional battery configured for that particular cell phone. That is the attachment features, such as feature 658, are configured to attach the battery housing 652 to the particular cell phone.

Figure 10:
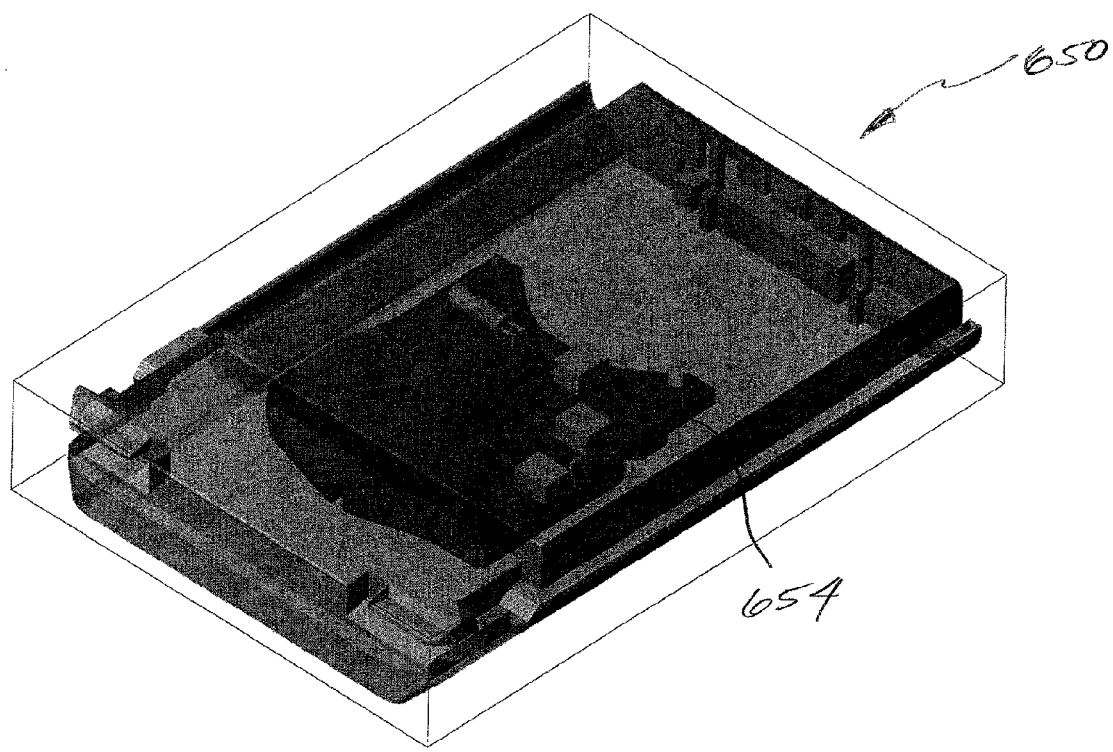
FIG. 10 is a top view of the battery/child unit assembly of FIG. 9.

FIG. 10 is simply a bottom view of the battery assembly 650 with the child unit circuitry 654 incorporated therein. As with the conventional battery, the battery assembly 650 is configured to snap into the cell phone to stay secured therein during use.

Figure 11:
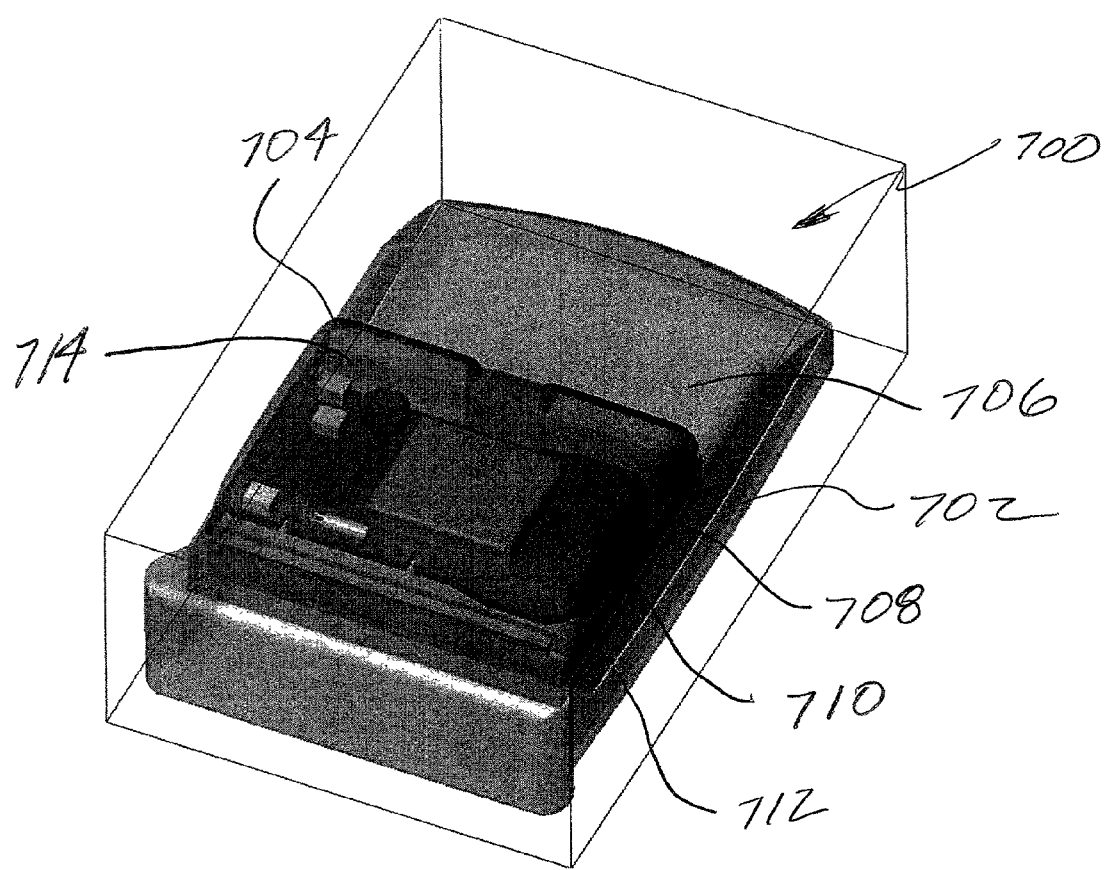
FIG. 11 is a bottom perspective view of a second embodiment of a battery/child unit assembly in accordance with the principles of the present invention.

FIG. 11 illustrates yet another embodiment of a battery assembly, generally indicated at 700 in accordance with the present invention. The battery assembly 700 is configured for use with a STARTAC cell phone 702 manufactured by Motorola. The battery assembly 700 is configured in a piggy-back arrangement to the cell phone 702 and includes a housing 704 that extends above the back surface 706 of the cell phone 702. Because the batteries for such a cell phone are configured to be compact to match the compact size of the phone 702, there may not be room within the existing battery housing to contain both the battery 708 and the child unit circuitry 710. As such, the child unit circuitry 710 is stacked on top of the battery 708 with the housing 704 containing both the battery 708 and the child unit circuitry 710. Because the battery receiving recess 712 of many cell phones is similarly configured with the back side 714 exposed, the battery assembly 700 can be configured to have a greater thickness without interfering with the operation of the cell phone 702.

Figure 12:
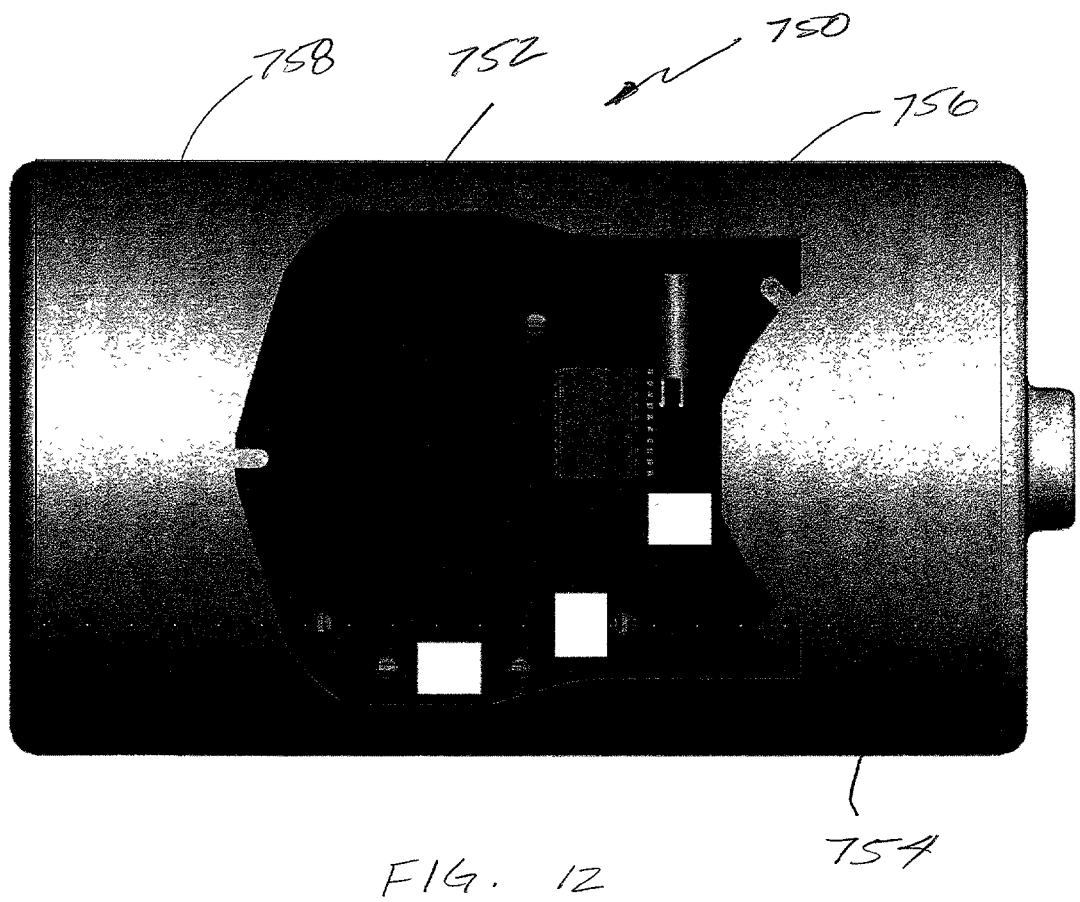
FIG. 12 is a side plan view of a third embodiment of a battery/child unit assembly in accordance, with the principles of the present invention.

FIG. 12 illustrates yet another embodiment of a battery/child unit assembly, generally indicated at 750, in accordance with the principles of the present invention. The child unit 752 is attached to the side 754 of the battery 756. The battery 756 is a conventional type battery such as a C or D battery. Because of the added expense of the child unit 752 the battery would most likely be of the rechargeable type. The child unit 752 may also be incorporated into the outer housing 758 of the battery 756 so as to not alter the exterior shape of the battery. The child unit 752 is configured similarly to that illustrated in FIG. 8 and is electrically connected to the battery 756 so as to utilize power from the battery 756 for operation of the child unit 752.

Figure 13A:
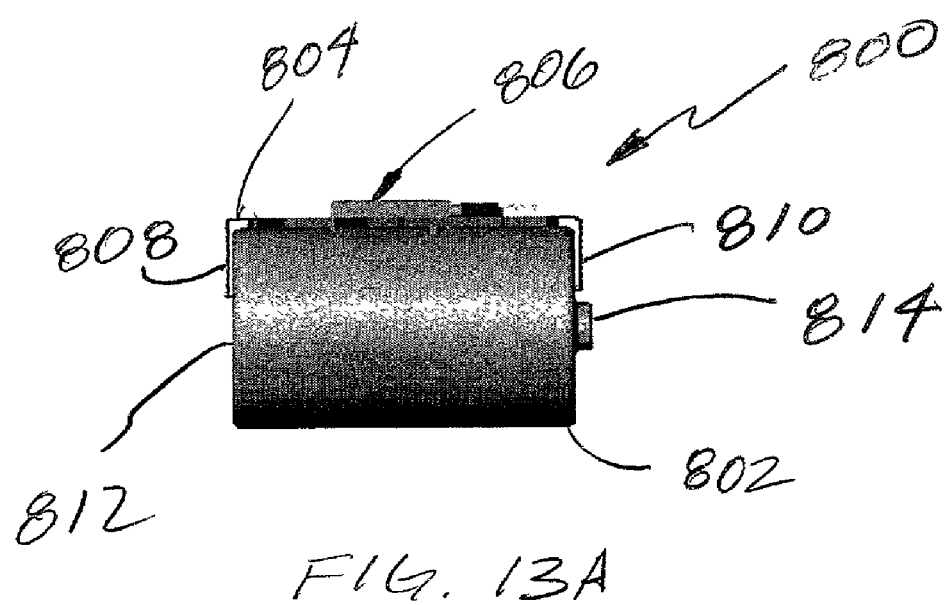
FIG. 13A is a side plan view of a fourth embodiment of a battery/child unit assembly in accordance with the principles of the present invention.

Referring now to FIG. 13A, there is shown a battery/child unit assembly, generally indicated at 800, in which the battery 802 is a conventional battery such as an AA, AAA, C, D, 12 Volt or the like, or in the form of more specialized types of batteries, such as those configured specifically for cell phones, laptop computers, automobiles, motorcycles or other electronic or mechanical devices that utilize a battery to which a child unit adapter assembly 804 is attached. The child unit 804 is comprised of child unit circuitry 806 similarly configured to that of FIG. 8. A pair of contacts 808 and 810 are coupled to the circuitry 806 for being coupled to the poles 812 and 814, respectively, of the battery 802. In addition to making electrical contact, the contacts 808 and 810 clamp the circuitry 806 to the battery 802 thus serving to hold the circuitry relative to the battery 802. The contacts 808 and 810 are of a thin and spring-like nature so as to apply a clamping force to the ends of the battery 802 while not interfering with the contact between the battery 802 and the electronic device in which the battery 802 is inserted. In this way, the battery 802 can be replaced as would be desired with the use of conventional alkaline batteries.

Figure 13B:
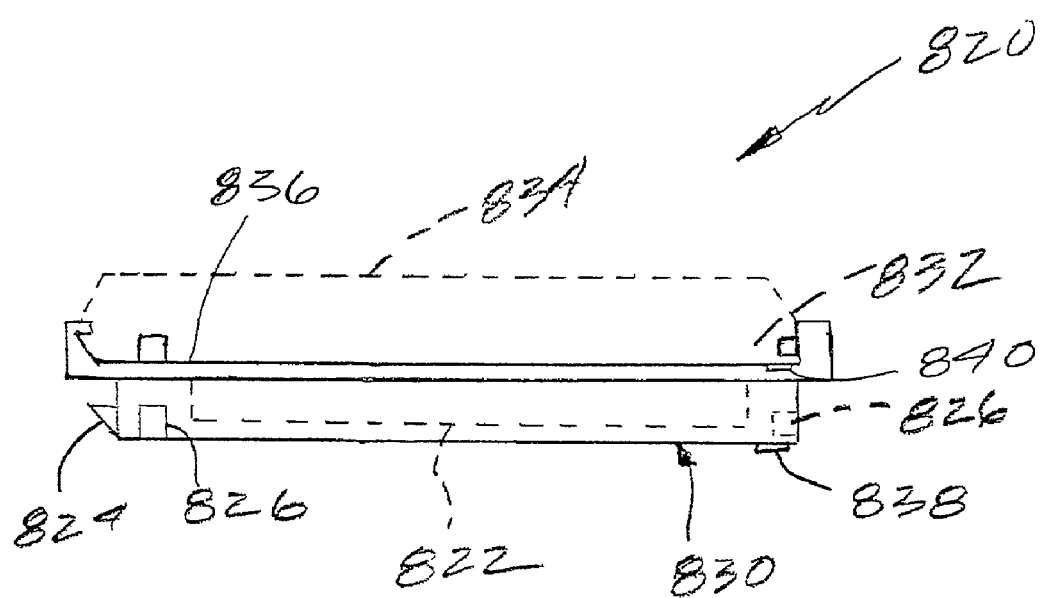
FIG. 13B is a side view of an embodiment of a child unit battery adapter configured for use with a cell phone.

FIG. 13B is a child unit adapter module, generally indicated at 820, in accordance with the present invention. The child unit adapter module 820 is configured in this example to fit within the battery compartment (not shown) of a cell phone. The child unit adapter module 820 houses a child unit 822. The child unit 822 is configured similarly to that illustrated in FIG. 8. The child unit adapter module 820 includes various external features 824, 826 and 828 for securing the child unit adapter module 820 to the battery compartment of a cell phone. The connecting portion 830 of the adapter is thus configured similarly to the connecting portion 832 of the cell phone battery 834. The child unit adapter module 820 also includes a cell phone battery compartment portion 836 that can receive and hold the battery 834. The compartment portion 836 of the adapter 820 is configured similarly to the battery compartment of the cell phone so as to properly receive and secure the cell phone battery 834 thereto. In addition, the child unit adapter module 820 includes contacts 838 for connecting the child unit adapter module 820 to the cell phone as well as terminals or contacts 840 in the battery compartment portion 836 for connecting the battery 834 to the child unit adapter module 820. Circuitry (not shown) is provided in the child unit adapter module 820 with the battery 834 to power the child unit 822 and to power the cell phone through the contacts 838. Thus, the child unit adapter module 820 allows the child unit adapter module 820 to removably attach to the cell phone in a "piggy-back" fashion allowing a conventional battery 834 to be utilized with the cell phone while giving the cell phone the tracking features of the present invention. Such an child unit adapter module 820 may be modified for inclusion with any battery operated device or devices employing a battery where it is desired to utilize an existing battery with the device while including a child unit therein.

Figure 14:
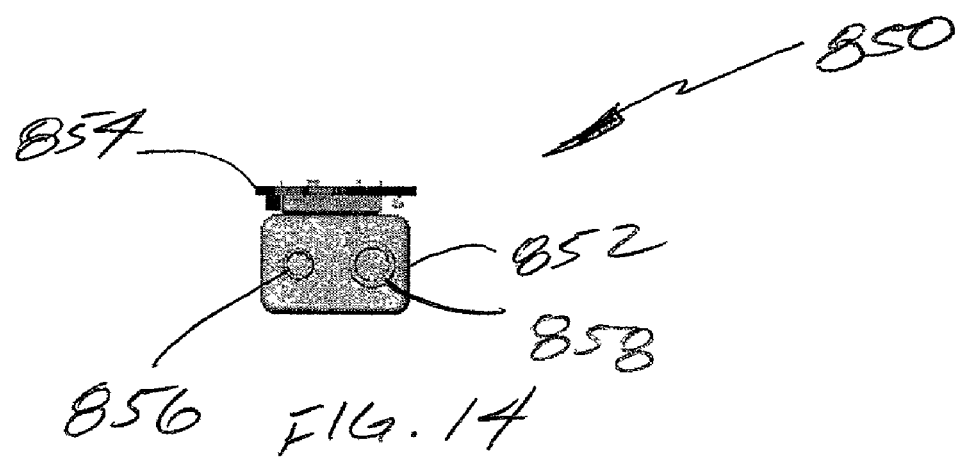
FIG. 14 is an end plan view of a fifth embodiment of a battery/child unit assembly in accordance with the principles of the present invention.
Figure 15:
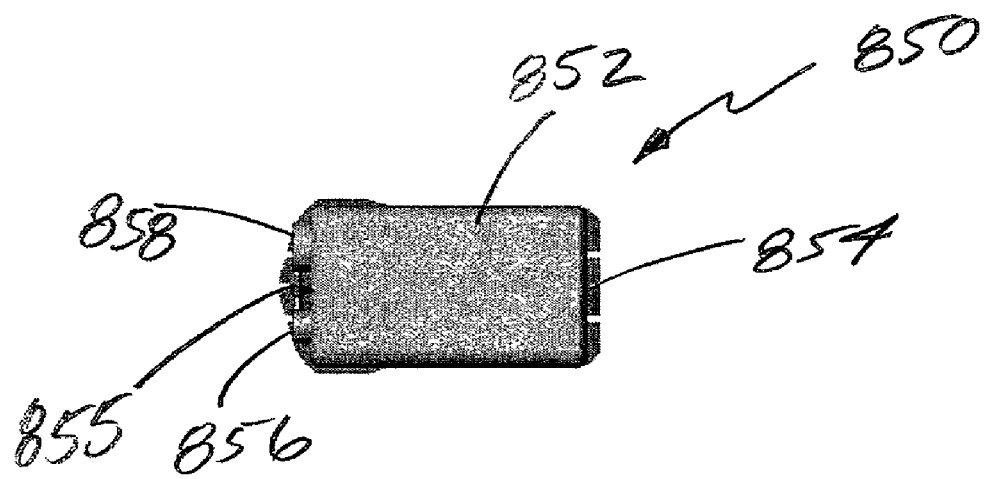
FIG. 15 is a bottom view of the battery/child unit assembly shown in FIG. 14.

FIGS. 14 and 15 illustrate a similar configuration of a battery/child unit assembly, generally indicated at 850, in accordance with the present invention, but incorporating a 9Volt type battery 852. The battery/child unit assembly 850 is comprised of a battery 852 and a child unit adaptor module 854. As with other embodiments herein, the child unit adaptor module 854 is configured to be thin enough so as to not interfere with insertion of the battery/child unit assembly 850 into an electronic device using such types of batteries. Likewise, the child unit adaptor module 854 may be incorporated into the battery 852 so as to be totally or partially concealed. Moreover, the child unit adaptor module 854 may include an adapter portion 855 shown in FIG. 15 to couple the child unit adaptor module 854 to the terminals 856 and 858 of battery 852 to allow inclusion and removal of the child unit adapter module 854 as desired.

Figure 16:
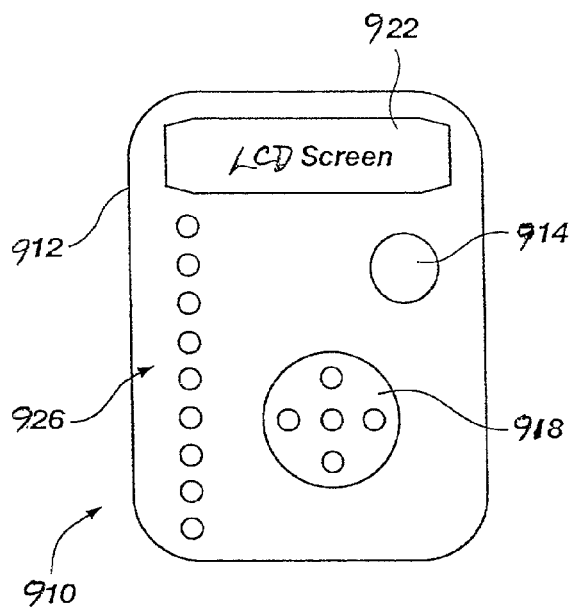
FIG. 16 is a front view of a fifth embodiment of a parent unit in accordance with the principles of the present invention.

When used in combination with a parent unit, such as the parent unit 910 shown in FIG. 16, the child unit and parent unit work in combination to provide the tracking features taught and described herein. The parent unit 910 includes a reset button 914 for resetting transmissions between parent and child devices in the invention. Further, if the reset button 914 is held down, for example for approximately two seconds, the parent unit 910 may be set into a programming mode in which various programming parameters can be entered into the parent unit (to be discussed in relation to FIGS. 17 and 18). FIG. 16 also shows a speaker 918 for indicating various conditions or mode changes in the parent unit 910. Once the parent unit 910 is properly programmed, the speaker 918 may make an audible sound to alert the person using it of changes in the parent unit such as low battery or mode changes. The audible sound could be a recorded voice message or simply an alarm sound. Further, the audible sound could change tone or frequency as the parent unit 910 alters its range from the object. In addition, FIG. 16 shows a display screen 922 in the housing 912 of the parent unit 910 for displaying information about the mode and function of the parent unit. For example, the display screen 922 can be used to display information such as system status, alarm distances, timer settings, and object names. Finally, FIG. 16 illustrates a series of lights 926 on the housing. In one mode of the parent unit 910, these lights 926 will assist the person using the parent unit 910 to find a lost or misplaced object by lighting up (or turning off) one at a time as the person nears the object. Of course, the function of the series of lights 926 could just as well be performed by a digitally displayed image of a bar on the display screen 922; the bar would adjust in length depending on the distance of the parent unit 910 from the object. If a global positioning system is employed, the display on the parent unit could merely point to the direction of the lost child unit. These tracking functions are sometimes collectively referred to as a tracking mechanism. Further, the above described "alarms" are only limited in that they are humanly perceptible signals, e.g., a vibration, an audible sound, a light, etc. In general, these humanly perceptible signals are produced through what is sometimes referred to as an alarm mechanism. The above and other functions of the parent unit 910 are implemented through a processor such as a microprocessor or analog or solid state electrical circuitry that operates in conjunction with a communicating device such as a transceiver to communicate with the child device. This communicating device could operate as either a digital or analog device.

Figure 17:
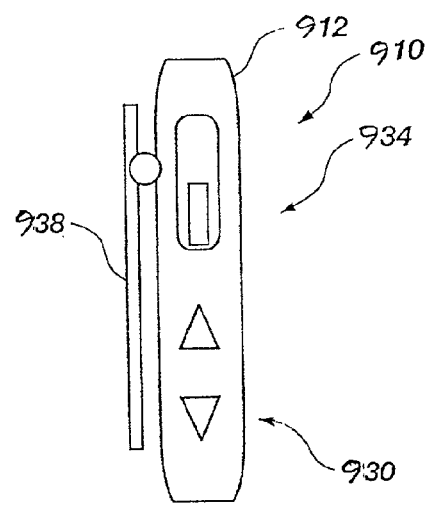
FIG. 17 is a side view of the parent unit of FIG. 16.

FIG. 17 shows a side view of the parent unit 910 in which arrow keys 930 are illustrated on the housing 912. When the parent unit 910 is in the appropriate mode, the arrow keys 930 perform a control function such as adjusting a value of a number that represents a distance or time value. Of course, one of the arrow keys 930 will increase the value while the other arrow decreases the value. Also shown in FIG. 17 is a power switch 934 for activating or deactivating the parent unit 910. This function is sometimes referred to as "selective activation" and indicates that the parent unit 910 (as well as the child device) can be selectively turned on or off. When the parent unit 910 is turned on (activated), the unit may start a self check program which determines if all components of the unit are in proper working condition. For example, the self check program may check the speaker 918 (FIG. 16), the display screen 922 (FIG. 16), the series of lights 926 (FIG. 16), etc. If the conditions are satisfactory, the parent unit 910 will continue operation. Alternatively, when the parent unit 910 is turned off (deactivated), the unit will indicate that the system has been turned off through means such as a "shut down" message on the display screen 922 (FIG. 16). After the parent unit 910 indicates that the power has been turned off, the person using the parent unit may have a set amount of time in which to acknowledge that the system has been powered off. Thus, the person may acknowledge power off by pressing the reset button 914 (FIG. 16) at which time the self check program is run and, if there are no error conditions, the parent unit 910 shuts down as well as suspending signals from the child device. In the event that there is an error condition, the display screen 922 (FIG. 16) will display the error condition and the unit can be serviced. Also shown in FIG. 17 is a clip 938 attached to the housing 912 for attaching the parent unit 910 to an object. Of course, rather than the clip 938, the housing 912 could have hook and loop material, a snap, or other attachment assemblies for attaching the parent unit 910 to the person managing the objects.

Figure 18:
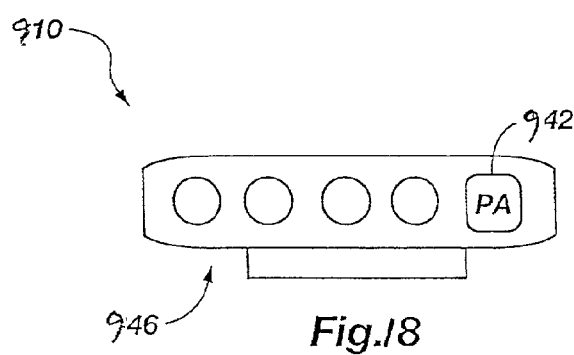
FIG. 18 is a top view of the parent unit of FIG. 16.

FIG. 18 shows a top view of the parent unit 910 wherein a pause button 942 for temporarily shutting down the parent unit is illustrated. When the pause button 942 is activated while the parent unit 910 is operating in normal mode, the pause button shuts the parent unit down for a selectable length of time (usually approximately 15 minutes) and will notify the person, for example every minute, after the time period has expired until the person reactivates the parent unit as by pressing the reset button 914 (FIG. 16) or by pressing the pause button again. When the pause button 942 is activated while the parent unit 910 is operating in an alarm mode, the pause button causes the parent unit to discontinue indicating the alarm mode for a selectable length of time (such as approximately 5 minutes) at which time the parent unit will again indicate the alarm mode if it is still present.

Also shown in FIG. 18 is a set of four object indicator buttons 946. When pressed, each of these buttons 946 enable (or disable) the tracking of a particular child device while placing the other child devices on hold. The object indicator button 946 that is pressed is associated with the particular child device to be managed, thus, each of the objects can be managed separately by pressing the corresponding object indicator button. Of course there can be more or less buttons in other embodiments and the embodiment of FIG. 18 is only illustrative. Further, the object indicator buttons 946 may each include a light that flashes on or off according to the distance of a child device from the parent unit 910.

As stated above, the parent unit 910 of FIGS. 16–18 has programmable parameters that can be adjusted when the reset button 914 (FIG. 16) is held down as for approximately two seconds. These parameters may be programmed through use of the pause button 942 (FIG. 18), the up/down arrow keys 930 (FIG. 17), the object indicator buttons 946 (FIG. 18), or a combination thereof, collectively referred to as a parent control mechanism. For example, the parent unit 910 may be programmed to signal a user with lights when the child device has exceeded a certain distance from the parent unit 910 and to signal the user audibly when the child device has exceeded a further distance from the parent unit 910. In one embodiment where the parent unit 910 includes a vibrator, the parent unit can be programmed to activate the vibrator at a first distance from the child device for silently indicating when the child device is outside the first distance, to activate lights at a second distance, and to activate an audible alarm at a third distance. Thus, the parent unit 910 can be programmed to activate multiple alarm modes according to variable distances between the parent unit and the child devices. As stated above, this programming is performed through use of the processor such as a microprocessor or the solid state electrical circuitry.

With the system of the present invention, a user can manage objects that are in their possession by attaching a child/battery unit to each of the objects they would like to track and then programming the parent unit 910 to contain the desired management parameters, i.e., distances, times, etc. Thus, the user can select exactly how they want to be notified when one of the objects in their possession is not where it should be. Further, the user can modify their management parameters on the fly when they have changed how they would like to be notified. A significant advantage of the present invention is the ability to deactivate selected child units from the parent unit, thus, allowing the user to change their mind concerning which objects need to be managed.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A system for selectively detecting the presence of at least one battery operated electronic device, comprising:
    a battery;
    at least one child unit incorporated into a housing of the battery and drawing power therefrom having a first communicating device comprising a transceiver for sending a locator signal, wherein the transceiver does not comprise a cell phone transceiver; and
    a parent unit having a second communicating device for receiving the locator signal from at least one child unit and a processor for monitoring the at least one child unit and for determining whether the at least one child unit is within a preselected range.

2. The system of claim 1, wherein said battery comprises a cell phone battery.

3. The system of claim 1, wherein said battery is comprised of one of a AA battery, a AAA battery, a C battery, a D battery, a 9 Volt battery, and a 12 Volt battery.

4. The system of claim 1, wherein said at least one child unit is stacked onto said battery.

5. The system of claim 1, wherein said at least one child unit comprises a microcontroller for controlling transmission of said at least one child unit.

6. The system of claim 1, wherein said at least one child unit is electronically coupled to said battery so as to draw power from said battery.

7. A system for selectively detecting the presence of at least one battery operated electronic device, comprising:
    a battery;
    an adapter configured for attaching between said electronic device and said battery, said adapter comprising child unit circuitry for communicating with a parent unit, said child unit circuitry comprising a transceiver; and
    wherein said battery is configured to attach directly to said electronic device without said adapter.

8. The system of claim 7, further comprising a parent unit having a communicating device for receiving a locator signal from said child unit circuitry, a processor for monitoring the locator signal and for determining whether a child unit including the child unit circuitry is within a preselected range.

9. The system of claim 7, wherein said battery comprises a cell phone battery.

10. The system of claim 7, wherein said battery is comprised of one of a AA battery, a AAA battery, a C battery, a D battery, a 9 Volt battery, and a 12 Volt battery.

11. The system of claim 7, wherein said adapter is configured to be attached to the poles of the battery.

12. The system of claim 7, wherein said adapter is stacked on said battery.

13. The system of claim 7, wherein said adapter comprises a microcontroller for controlling transmission of said child unit circuitry.

14. The system of claim 7, wherein said child unit circuitry is comprised of at least one of analog and digital circuitry.

15. The system of claim 7, wherein the adapter is configured to attach to a cell phone and said battery is configured to attach to said adapter.

16. A system for selectively detecting the presence of at least one battery operated electronic device, comprising:
    a cell phone battery;
    an adapter configured for attaching to said cell phone battery and drawing power therefrom and comprising child unit circuitry for communicating with a parent unit, said adapter stacked on said battery;
    a parent unit having a communicating device for receiving a locator signal from said child unit circuitry, a processor for monitoring the locator signal and for determining whether a child unit including the child unit circuitry is within a preselected range; and
    wherein the cell phone battery is configured for attachment to the electronic device without the adapter, allowing operation of the electronic device directly and without added functionality provided by the adapter.

17. The system of claim 16, wherein said adapter is configured to attach to a cell phone and said battery is configured to attach to said adapter.

18. A system for selectively detecting the presence of at least one battery operated electronic device, comprising:
    a battery;
    an adapter configured for attaching between said electronic device and said battery, said adapter comprising child unit circuitry for communicating with a parent unit and said adapter configured to be attached to the poles of the battery; and
    wherein said battery is configured to attach directly to said electronic device without said adapter.

19. The system of claim 18, further comprising a parent unit having a communicating device for receiving a locator signal from said child unit circuitry, a processor for monitoring the locator signal and for determining whether a child unit including the child unit circuitry is within a preselected range.

20. The system of claim 18, wherein said battery comprises a cell phone battery.

21. The system of claim 18, wherein said battery is comprised of one of a AA battery, a AAA battery, a C battery, a D battery, a 9 Volt battery, and a 12 Volt battery.

22. The system of claim 18, wherein said child unit circuitry comprises a transceiver.

23. The system of claim 18, wherein said adapter is stacked on said battery.

24. The system of claim 18, wherein said adapter comprises a microcontroller for controlling transmission of said child unit circuitry.

* * * * *